No. 850,946. PATENTED APR. 23, 1907.
J. J. MATHEY.
DISK PLOW.
APPLICATION FILED JUNE 9, 1906.
2 SHEETS—SHEET 2.
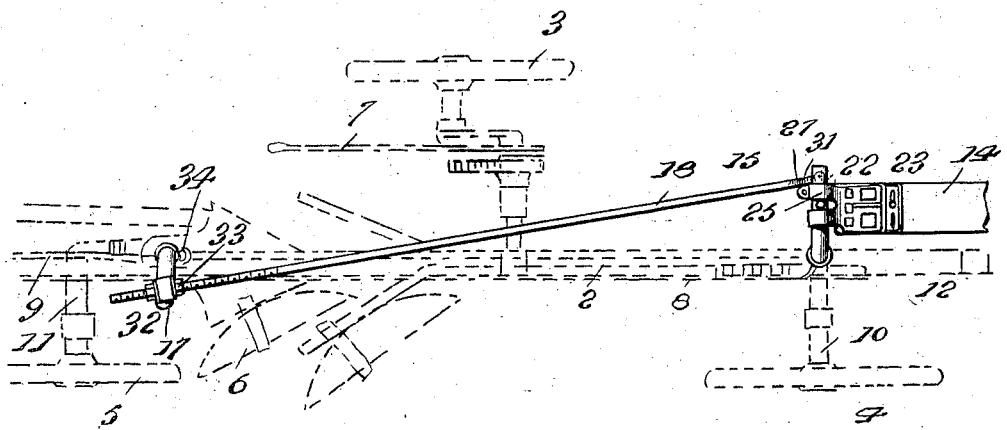
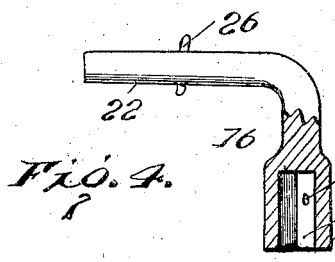
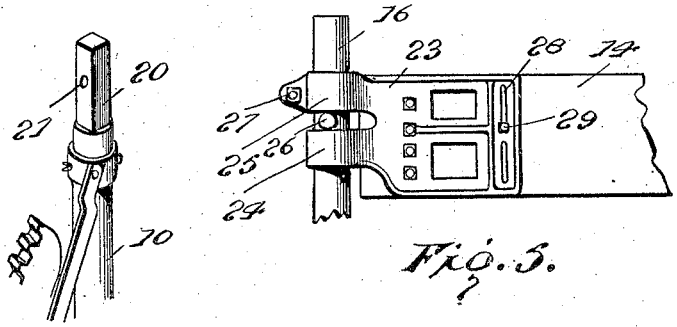

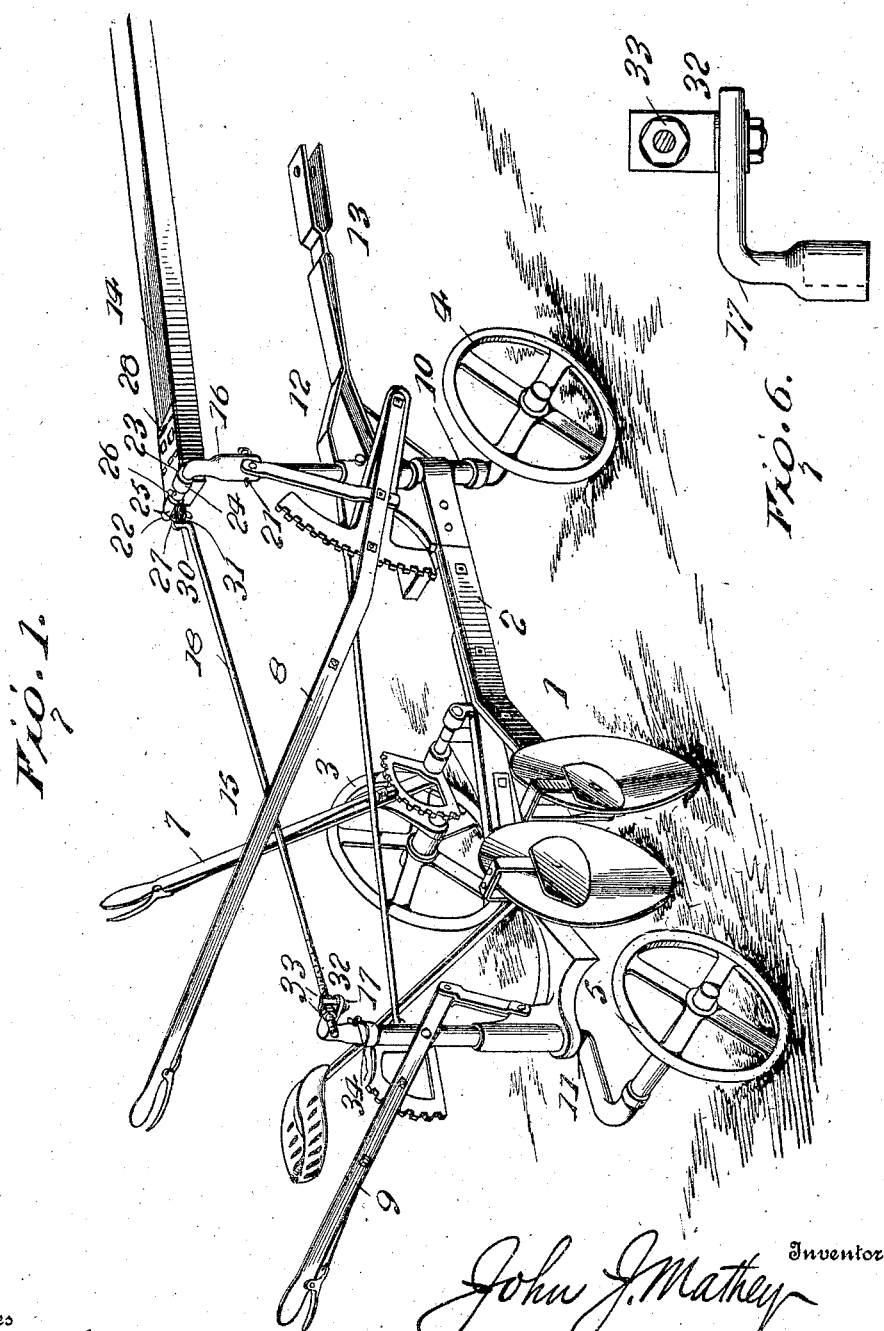

UNITED STATES PATENT OFFICE.

JOHN J. MATHEY, OF ROBEY, SOUTH DAKOTA.

DISK PLOW.

No. 850,946.      Specification of Letters Patent.      Patented April 23, 1907.

Application filed June 9, 1906. Serial No. 320,929.

*To all whom it may concern:*

Be it known that I, JOHN J. MATHEY, a citizen of the United States, residing at Robey, in the county of Aurora and State of South Dakota, have invented certain new and useful Improvements in Disk Plows, of which the following is a specification, reference being had therein to the accompanying drawings.

My invention relates to improvements in plows, particularly wheel-supported rotary disk plows.

One object of the invention is to provide a plow of this character with a steering-tongue and connections with its supporting-wheels whereby it may be readily guided or steered.

Another object of the invention is to provide a simple and practical device of this character in the form of an attachment that may be applied to any make of plow.

Further objects and advantages of the invention, as well as the structural features by means of which they are attained, will be made clear by an examination of the following specification, taken in connection with the accompanying drawings, in which—

Figure 1 is a perspective view of a plow with my improvements applied thereto. Fig. 2 is a top plan view of my improvements, showing them in operative position upon the plow, the latter being shown in dotted lines. Fig. 3 is a perspective view of the upper end of the shaft of the front wheel of the plow. Fig. 4 is a side elevation, partly in section, of the crank-arm for the shaft shown in Fig. 3. Fig. 5 is a plan view of the adjustable connection for the rear end of the steering-tongue. Fig. 6 is a detail view of the crank-arm for the shaft of the rear wheel of the plow, and Fig. 7 is a perspective view of the rear end of the coupling-plate upon the steering-tongue.

Referring to the drawings by numeral, 1 denotes a plow of well-known form and construction, comprising a frame 2, supporting-wheels 3, 4, and 5 therefor, and a rotary earth-working disk or plow proper, 6. The land-wheel 3 is adjustable in the usual manner by means of a lever 7, while the front and rear furrow-wheels 4 5 are also adjustable vertically by means of levers 8 9. The round shafts 10 11 of the wheels 4 5 have vertical portions mounted for both sliding and rotary or swinging movement in suitable bearings upon the frame 2. Upon the front of the latter is a forwardly-projecting arm 12, carrying a clevis 13, to which the draft-animals are attached in the usual manner.

In the practice of my invention I provide a steering tongue or pole 14 and connections 15 between the latter and the shafts 10 11 of the front and rear wheels 4 5, so that the plow may be readily guided or steered. The connections 15 consist of a crank-arm 16, which is mounted upon the shaft 10 and upon which is mounted the tongue 14, a crank-arm 17, mounted upon the shaft 11, and a rod 18, connecting said crank-arms to cause them to swing together when the tongue is moved laterally. The arm 16 is right-angular in form and has its vertical portion enlarged and provided with a square socket 19 to receive the squared upper end 20 of the shaft 10. These parts are held together by a transverse pin passed through alining apertures 21 formed in them. The tongue 14 is mounted on the horizontal portion 22 of the arm 16 by means of hinge-plate or casting 23, which comprises a substantially rectangular body formed at one end with a cylindrical socket 24 to receive the cylindrical horizontal portion 22 of the arm 16 and with a split socket 25, through which said portion 22 also extends, said sockets 24 25 being spaced apart to permit a split pin or the like 26 to be passed through a transverse aperture in said portion 16 to prevent longitudinal movement of the casting 23 upon the portion 16 of said arm. Said casting, and hence the tongue 14, may swing vertically upon the portion 16; but it may be clamped thereon by tightening the nut on a bolt 27, that is passed through apertured ears upon the two members of the split socket 25. The tongue 14 is transversely or laterally adjustable upon the body portion of the casting 23 by forming in the latter transverse slots 28 and a transverse row of apertures, through which latter, said slots and apertures in said tongue, may be passed bolts 29, as clearly shown in Fig. 5 of the drawings. From the under side of the socket 25 projects a lateral lug or arm 30, apertured to receive a hook 31, formed on the front end of the connecting-rod 18. The rear end of the latter is screw-threaded and passed through the apertured block swiveled upon the outer end 32 of the crank-arm 17. Washers and nuts 33 are provided upon the screw-threads of the rod on opposite sides of the arm 17, so that said rod may be adjusted in the latter for the purpose of varying the length of the connection between the two crank-arms. The arm 17 has its inner end formed with a vertical socket to receive the shaft 11, and it is retained thereon by means of set-screws 34 or in any other suitable manner.

The construction, operation, and advantages of the invention will be readily understood from the foregoing description, taken in connection with the accompanying drawings. It will be seen that owing to the connections 15 the wheels 4 5 will swing angularly whenever the tongue 14 is swung, since said tongue is connected to the crank-arm 16 on the shaft 10 of the front wheel 4 and the tongue is also connected by the rod 18 to the crank-arm 17 on the shaft 11 of the rear wheel 5. By reason of the adjustable connections between the several parts they may be set to operate in a most effective manner.

While the invention is shown and described as in the form of an attachment that may be applied to the plow illustrated or to one of any other suitable form and construction, it will be understood that it may be in the form of a permanent part of the plow and made when the latter is manufactured. It will also be understood that various changes in the form, proportion, and the minor details of construction may be resorted to without departing from the spirit or sacrificing any of the advantages of the invention as defined by the appended claims.

Having thus described my said invention, what I claim as new, and desire to secure by Letters Patent of the United States, is—

1. A plow comprising a frame provided with bearings, front and rear shafts having vertical portions journaled in said bearings, steering-wheels rotatably mounted upon the lower ends of said shafts, crank-arms detachably secured upon the upper ends of said shafts, a steering-tongue, a hinge-plate formed with transverse slots and with a socket to receive the horizontal portion of the crank-arm on said front shaft, means for retaining said crank-arm in said socket, fastenings passed through the slots in said hinge-plate and into said tongue for adjusting said hinge-plate transversely upon said tongue and securing the same thereto, a laterally-projecting arm formed upon said hinge-plate, and a connecting-rod having its front end loosely engaged with said laterally-projecting arm and its rear end connected to the crank-arm upon said rear shaft, substantially as shown and described.

2. A plow having a frame provided with bearings, front and rear shafts having vertical portions journaled in said bearings, steering-wheels rotatably mounted upon the lower ends of said shafts, crank-arms detachably secured upon the upper ends of said shafts, a steering-tongue, a hinge-plate adjustable transversely upon said tongue and formed with spaced sockets to receive the horizontal portion of the crank-arm on the front shaft, a pin for retaining said crank-arm in said sockets, an apertured arm projecting laterally from said hinge-plate, a connecting-rod having a hook at its forward end to engage the aperture in said apertured arm, and an adjustable pivotal connection between the rear end of said rod and the horizontal portion of the crank-arm on said rear shaft, substantially as shown and described.

3. A plow having a frame provided with bearings, front and rear shafts having vertical portions mounted to turn in said bearings, front and rear steering-wheels rotatably mounted upon said lower ends of said shafts, said front shaft having a polygonal-shaped upper end, a crank-arm formed at one end with a socket to engage said polygonal-shaped upper end of the front shaft, a pin for retaining said socket upon said shaft, a steering-tongue, a hinge-plate secured upon said tongue and formed with spaced sockets to receive the horizontal portion of said crank-arm, a pin in said crank-arm between said spaced sockets for retaining the hinge-plate upon said crank-arm, an apertured arm projecting from said hinge-plate, a second crank-arm having a vertical socket to fit upon the upper end of said rear shaft, means for securing the last-mentioned socket upon said rear shaft, an apertured block swiveled in the upper horizontal portion of said second crank-arm, a connecting-rod having a hook at its front end to engage the aperture in said apertured arm upon the hinge-plate, the rear end of said rod being screw-threaded and projecting through said swiveled block, and nuts upon the threaded end of said rod on opposite sides of said swiveled block, substantially as shown and described.

In testimony whereof I hereunto affix my signature in presence of two witnesses.

JNO. J. MATHEY.

Witnesses:
JAMES MAFERNS,
PETER KREMER, Jr.